(12) United States Patent
Young

(10) Patent No.: US 7,062,501 B1
(45) Date of Patent: Jun. 13, 2006

(54) STRUCTURE AND METHOD FOR LINKING SCATTER/GATHER LIST SEGMENTS FOR HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 498 days.

(21) Appl. No.: 09/925,135

(22) Filed: Aug. 8, 2001

(51) Int. Cl.
*G06F 17/30* (2006.01)

(52) U.S. Cl. .................. 707/102; 707/101; 710/33; 710/20; 710/9; 710/5; 710/4; 711/170; 711/114

(58) Field of Classification Search .................. 710/22, 710/26, 40, 108, 103; 709/108; 707/101
See application file for complete search history.

(56) References Cited

U.S. PATENT DOCUMENTS

| | | | | |
|---|---|---|---|---|
| 5,101,492 A | * | 3/1992 | Schultz et al. ................. | 714/7 |
| 5,249,279 A | * | 9/1993 | Schmenk et al. .............. | 710/5 |
| 5,379,431 A | * | 1/1995 | Lemon et al. ................. | 710/10 |
| 5,440,716 A | * | 8/1995 | Schultz et al. ............... | 711/114 |
| 5,574,915 A | * | 11/1996 | Lemon et al. ............... | 712/220 |
| 5,592,648 A | * | 1/1997 | Schultz et al. ............... | 711/114 |
| 5,909,691 A | * | 6/1999 | Schultz et al. ................ | 711/4 |
| 5,999,927 A | * | 12/1999 | Tukey et al. .................... | 707/5 |
| 6,105,080 A | * | 8/2000 | Holt et al. ...................... | 710/26 |
| 6,202,105 B1 | * | 3/2001 | Gates et al. ................... | 710/20 |
| 6,279,051 B1 | * | 8/2001 | Gates et al. ................... | 710/20 |
| 6,449,709 B1 | * | 9/2002 | Gates .......................... | 712/202 |
| 6,505,268 B1 | * | 1/2003 | Schultz et al. .................. | 711/4 |
| 6,609,167 B1 | * | 8/2003 | Bastiani et al. ............. | 710/104 |
| 6,615,282 B1 | * | 9/2003 | Futral ............................. | 710/1 |
| 6,636,922 B1 | * | 10/2003 | Bastiani et al. ............. | 710/305 |
| 6,665,746 B1 | * | 12/2003 | Liong ........................... | 710/22 |
| 2002/0152328 A1 | * | 10/2002 | Kagan et al. ............... | 709/250 |
| 2003/0033477 A1 | * | 2/2003 | Johnson et al. ............. | 711/114 |

* cited by examiner

*Primary Examiner*—Jean M. Corrielus
(74) *Attorney, Agent, or Firm*—Gunnison, McKay & Hodgson, L.L.P.; Forrest Gunnison (57) ABSTRACT

A host adapter uses a scatter/gather list that includes a plurality of sections. Each section of the scatter/gather list can have any desired size. A link element in one section of the scatter/gather list is used to link to another section in the list. The link element has a format that is the same as the data elements that represent data segments in the list. Each element in the scatter/gather list includes an end-of-list flag and an end-of-section flag. When the end-of-list flag is set, the host adapter knows that the end-of-the scatter/gather list has been reached. When the end-of-section flag is set, the host adapter knows that an address to another section of the scatter/gather list is available.

21 Claims, 8 Drawing Sheets

| 234A { | Segment Address i1 <br> 231_i1 | Segment Address i2 <br> 231_i2 | Segment Address i3 <br> 231_i3 | ••• | Segment Address ij <br> 231_(i)(j) | Address Next List Section <br> 231_(i)(j+1) |
|---|---|---|---|---|---|---|
| | 0 | 0 | 0 | ••• | 0/1 | 0 |
| | 0 | 0 | 0 | ••• | 1 | 0 |

STRUCTURE AND METHOD FOR LINKING SCATTER/GATHER LIST SEGMENTS FOR HOST ADAPTERS

BACKGROUND OF THE INVENTION

1. Field of the Invention

The present invention relates generally to host adapters that couple two I/O buses, and more particularly to using a scatter/gather list in transferring data over a host I/O bus.

2. Description of Related Art

A host adapter 150 (FIG. 1A) connects I/O devices, such as data storage devices, on an I/O bus 180 to a host I/O bus 170. Examples of I/O devices are magnetic disk drives that typically are on a SCSI bus or alternatively a UDMA bus. Host system 100 typically has a PCI bus, as host I/O bus 170.

Figure 1A:
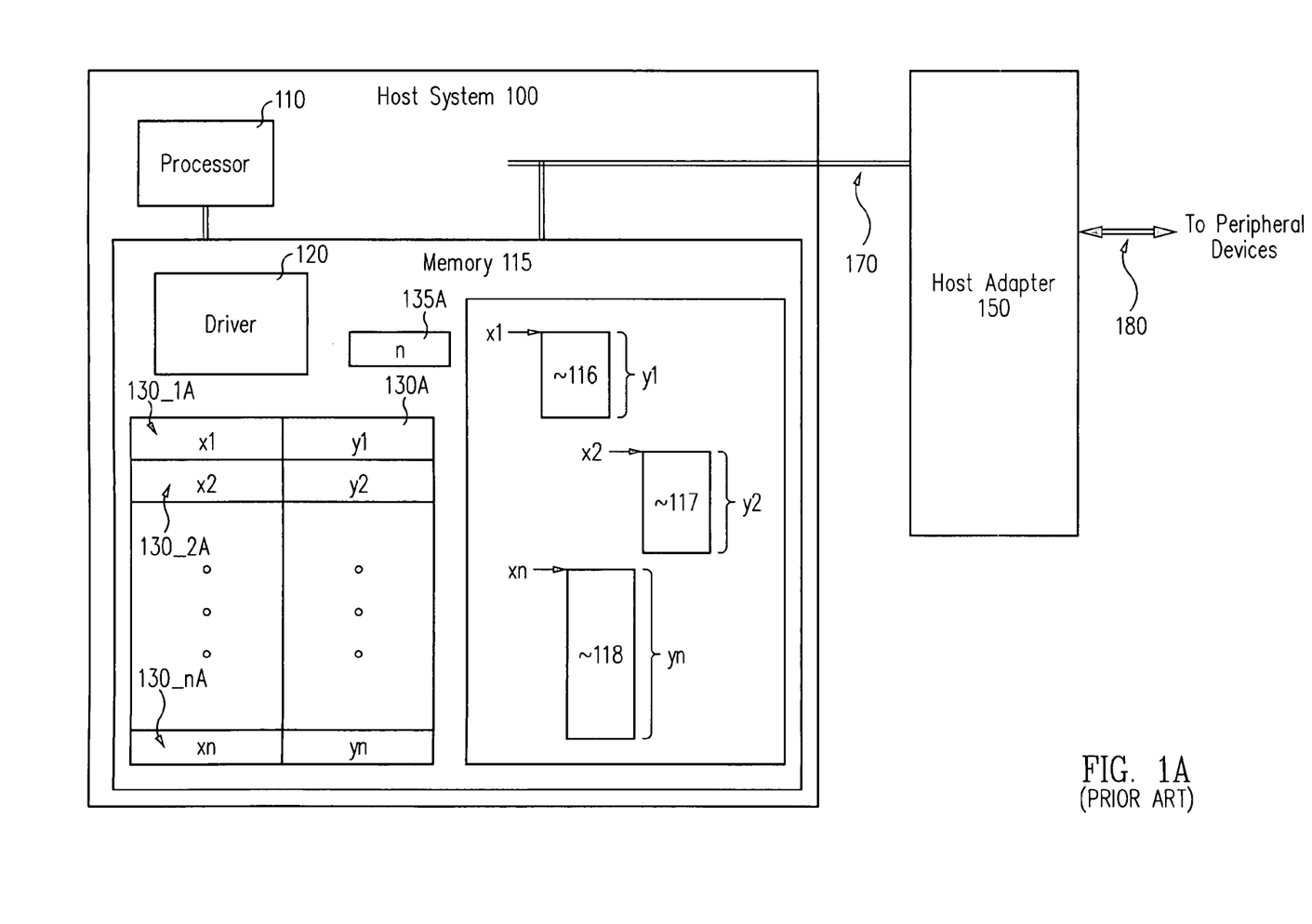
FIG. 1A is an illustration of a prior art host adapter system with a scatter/gather list, in contiguous memory locations, which used a list length variable.

In more general terms, host adapter 150 typically provides a connection between two different I/O buses 180 and 170. Host adapter 150 also provides functions associated with data transfer between host system 100 and the I/O devices on bus 180.

A host adapter driver 120 builds a hardware I/O control block that is provided to host adapter 150. The hardware I/O control block provides information to host adapter 150 on the area in host memory 115 that is to be used in the data transfer and a command that is to be transferred to the target I/O device.

The area in host memory 115 allocated for a particular data transfer is often fragmented into a plurality of segments, for example, segments 116, 117, and 118. Host adapter driver 120 generates a scatter/gather list 130A that identifies each of the plurality of segments. Each of elements 130_1A to 130_nA in scatter/gather list 130A specifies an address and length of one segment. For example, element 130_1A specifies segment 116, which is at address x1 and has a length y1. Typically, as shown in FIG. 1A, elements 130_1A to 130_nA are contiguous in memory 115.

The information in the hardware I/O control block contains the address of element 130_1A in list 130A. In the embodiment of FIG. 1A, the hardware I/O control block also includes a list length variable 135A that is the number of elements in list 130A. Memory is allocated both in host memory 115 and in memory of host adapter 150 for length list variable 135A, which can be several bytes in size, and for scatter/gather list 130A. Host adapter 150 decrements variable 135A as host adapter 150 works down scatter/gather list 130A. When variable 135A is decremented to zero, host adapter 150 recognizes that there are no more elements in list 130A. This event normally coincides with the end-of-the data transfer.

Figure 1B:
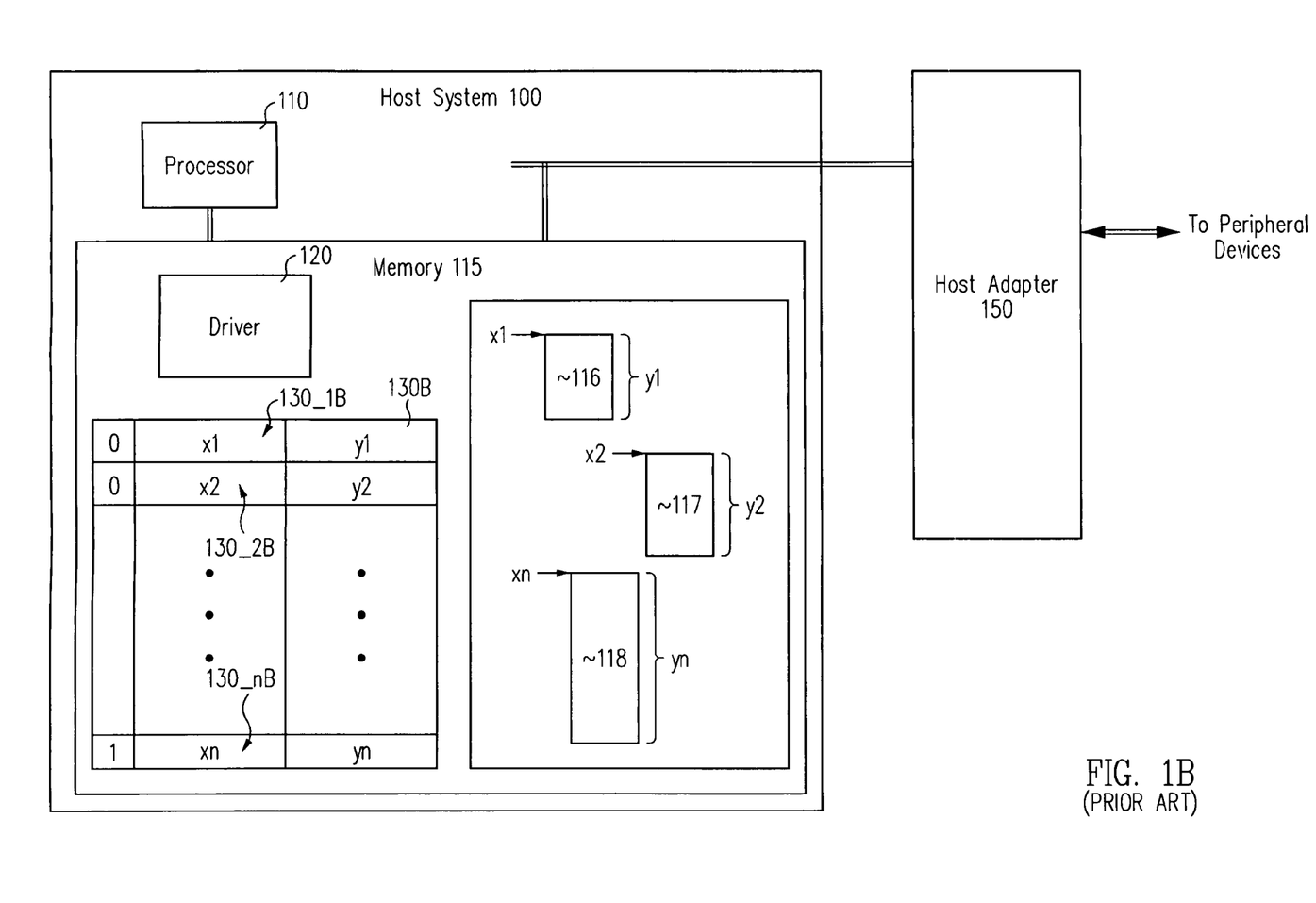
FIG. 1B is an illustration of a prior art host adapter system with a scatter/gather list, in contiguous memory locations, which used an end list flag bit.

The inefficiencies and limitations associated with list length variable 135A have been recognized. In the embodiment of FIG. 1B, each element of scatter/gather list 130B includes a single end list flag bit. For all elements of list 130B except the last element, the end list flag bit has a value of zero. For last element 130_nB, the end list flag bit has a value of one.

Hence, host adapter 150 tests the end list flag bit as each element of list 130B is processed. When the set end list flag bit is detected, host adapter 150 knows that the last element in scatter/gather list 130B is being processed.

The scheme has several advantages. No memory is allocated for list length variable 135A (FIG. 1A). Host driver 120 does not have to calculate list length variable 135A, and host adapter 150 does not have to manage list length variable 135A during the data transfer. The size of list 130B is not limited by the size of list length variable 135A.

While the scheme associated with FIG. 1B has many advantages, list 130B must still be in contiguous memory locations. Allocation of a large contiguous memory area in memory 115 can be problematic. Thus, it has been recognized that it is desirable to break a scatter/gather list into small discontiguous sections.

Figure 1C:
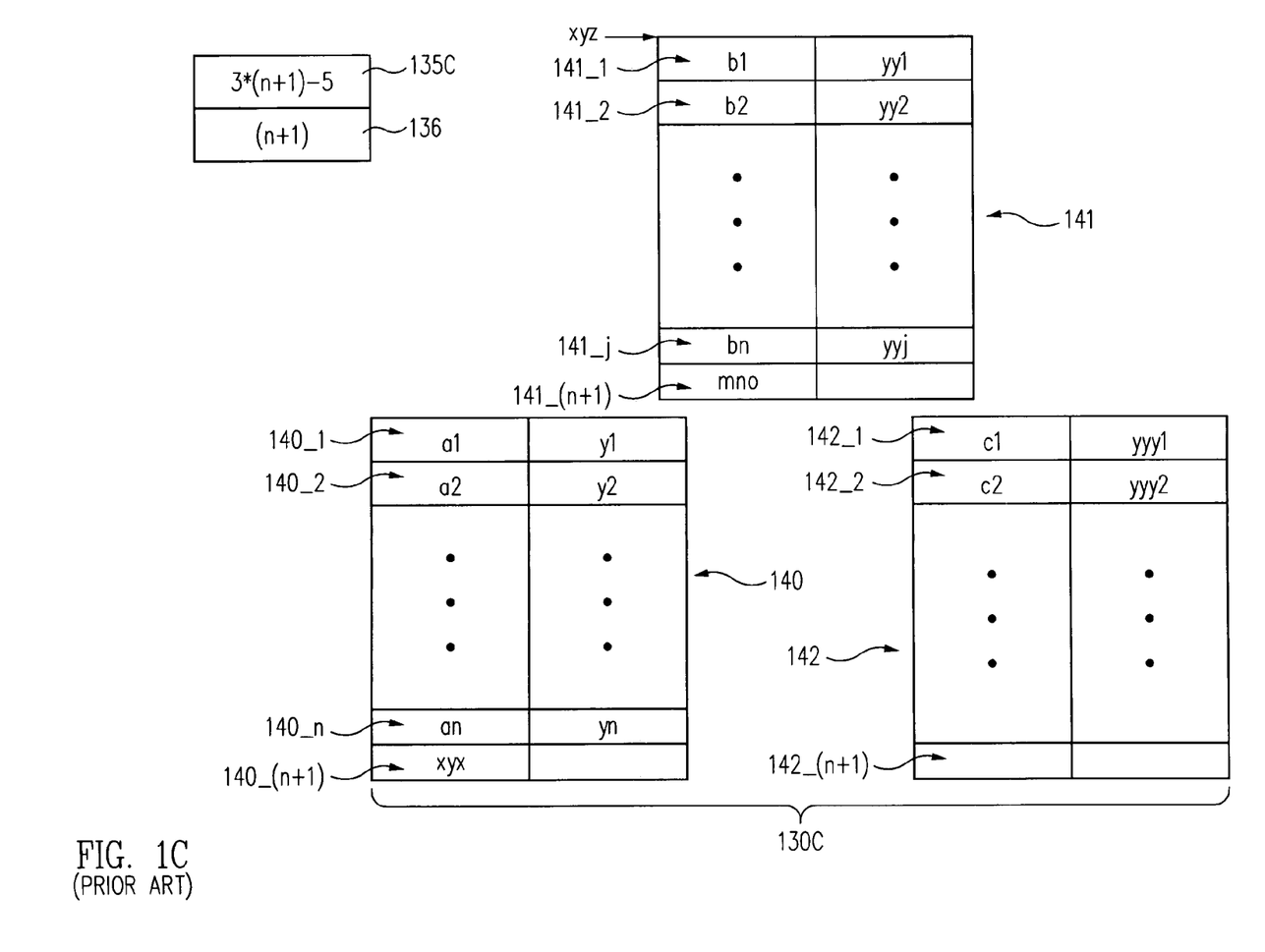
FIG. 1C is an illustration of a prior art host adapter system with a scatter/gather list in discontiguous memory locations that used a list length variable and a section length variable.

The SCSI standards committee has proposed breaking the scatter/gather list into smaller linked sections. The proposed technique is illustrated in FIG. 1C. Scatter/gather list 130C is broken into three sections 140, 141, and 142, in this example. Each of sections 140, 141, and 142 has (n+1) elements. This technique still requires a list length variable 135C that has a value that is the total length of scatter/gather list 130C. A second variable, a section length variable 136, is used to specify the number of elements in each of sections 140 to 142.

With this technique, host adapter 150 has to maintain both variables 135C and 136, and decrement each. When section length variable 136 reaches zero, the last element in a section is being processed. The address in the last element is not an address for a data segment, but rather the address of the next section of the scatter/gather list. When list length variable 135C reaches zero, host adapter 150 knows that the entire scatter/gather list 130C has been processed. While this technique allows the use of larger scatter/gather lists by eliminating the requirement that the entire scatter/gather list be in contiguous memory locations, the technique requires additional storage for second variable 136, and the total size of first variable 135C limits the total number of elements in scatter/gather list 130C. Also, the technique places additional processing requirements on host adapter 150. Thus, sections are useful only when both the additional storage required and the additional processing capability are available.

SUMMARY OF THE INVENTION

According to one embodiment of the present invention, a scatter/gather list includes a plurality of scatter/gather list sections stored in a memory. At least one scatter/gather list section includes a plurality of data elements. Each data element includes an end-of-list flag and an end-of-section flag. In this embodiment, each data element includes an address field that stores a data segment address and a length field that stores a data segment length. In a second embodiment, each data element includes only an address field that in turn stores a data segment address, the end-of-list flag and the end-of-section flag.

The at least one scatter/gather list section also includes a link element. In the first-mentioned embodiment, the link element includes an end-of-list flag, an end-of-section flag, an address field that stores an address to the next section of the scatter/gather list, and a length field. In the second embodiment, the link element includes only an address field that in turn stores an address to the next section of the scatter/gather list, the end-of-list flag and the end-of-section flag.

In one embodiment, the end-of-list flag has a same value in each data element of the at least one section. The end-of-section flag has a same value in each data element of the at least one section. In another embodiment, the end-of-section flag has a first value in a last data element in the plurality of data elements of the at least one section, and a second value in all other data elements in the plurality of data elements of the at least one section.

Hence, a scatter/gather list includes a plurality of scatter/gather list sections. At least one scatter/gather list section includes a plurality of data elements and a link element. Each data element includes an end-of-list flag, an end-of-section flag, an address field having a data segment address, and a length field having a data segment length. The link element includes an end-of-list flag, an end-of-section flag, and an address field having a next list section address.

In another embodiment, a scatter/gather list includes a plurality of scatter/gather list sections. At least one scatter/gather list section includes a plurality of data elements and a link element. In this embodiment, each data element consists of an address field that includes a data segment address, an end-of-list flag, and an end-of-section flag. The link element consists of an address field that includes a next list section address, an end-of-list flag and an end-of-section flag.

In still another embodiment, a structure includes a memory that in turn includes a scatter/gather list having a plurality of scatter/gather list sections. At least one of these scatter/gather list sections includes a plurality of data elements. Each data element includes an end-of-list flag, and an end-of-section flag. The at least one scatter/gather list section further includes a link element having an end-of-list flag, and an end-of-section flag.

A method according to one embodiment of the present invention includes storing a scatter/gather list as a plurality of sections in a memory. Each section includes a plurality of elements. Each element includes an address, an end-of-list flag, and an end-of-section flag. The method also sets an end-of-list flag in a last data element of a last section in the plurality of section, and sets an end-of-section flag in at least one of the plurality of sections other than the last section.

The scatter/gather list that includes a plurality of sections is used by a host adapter without having to transfer and manage a count of either the number of elements in a section or the number of elements in the complete scatter/gather list. The size of the scatter/gather list is no longer limited by a size of a list length variable that in turn defines the maximum number of element in the scatter/gather list. Further, the host I/O bus bandwidth utilization is improved over the prior art methods. It is no longer necessary to transfer variables, over the host I/O bus, defining the size of the scatter/gather list and the size of the sections making up the scatter/gather list.

The link element has a format that is the same as data elements that represent data segments in the list. This means that no special hardware configurations or hardware management are required for processing the link element.

BRIEF DESCRIPTION OF THE DRAWINGS

In the drawings and following detailed description, elements with the same reference numeral are the same or similar elements. Also, the first numeral of a reference number for an element indicates the drawing in which that element first appears.

DETAILED DESCRIPTION

According to one embodiment of the present invention, a scatter/gather list 230 (FIG. 2A) that includes a plurality of sections 230A to 230C is used by a host adapter 250 without having to transfer and manage a count of either the number of elements in a section or the number of elements in the complete scatter/gather list. The size of scatter/gather list 230 is no longer limited by a size of a list length variable that in turn defines the maximum number of element in the scatter/gather list. Further, the host I/O bus bandwidth utilization is improved over the prior art methods. It is no longer necessary to transfer variables, over host I/O bus 270, defining the size of the scatter/gather list and the size of the sections making up the scatter/gather list.

Figure 2A:
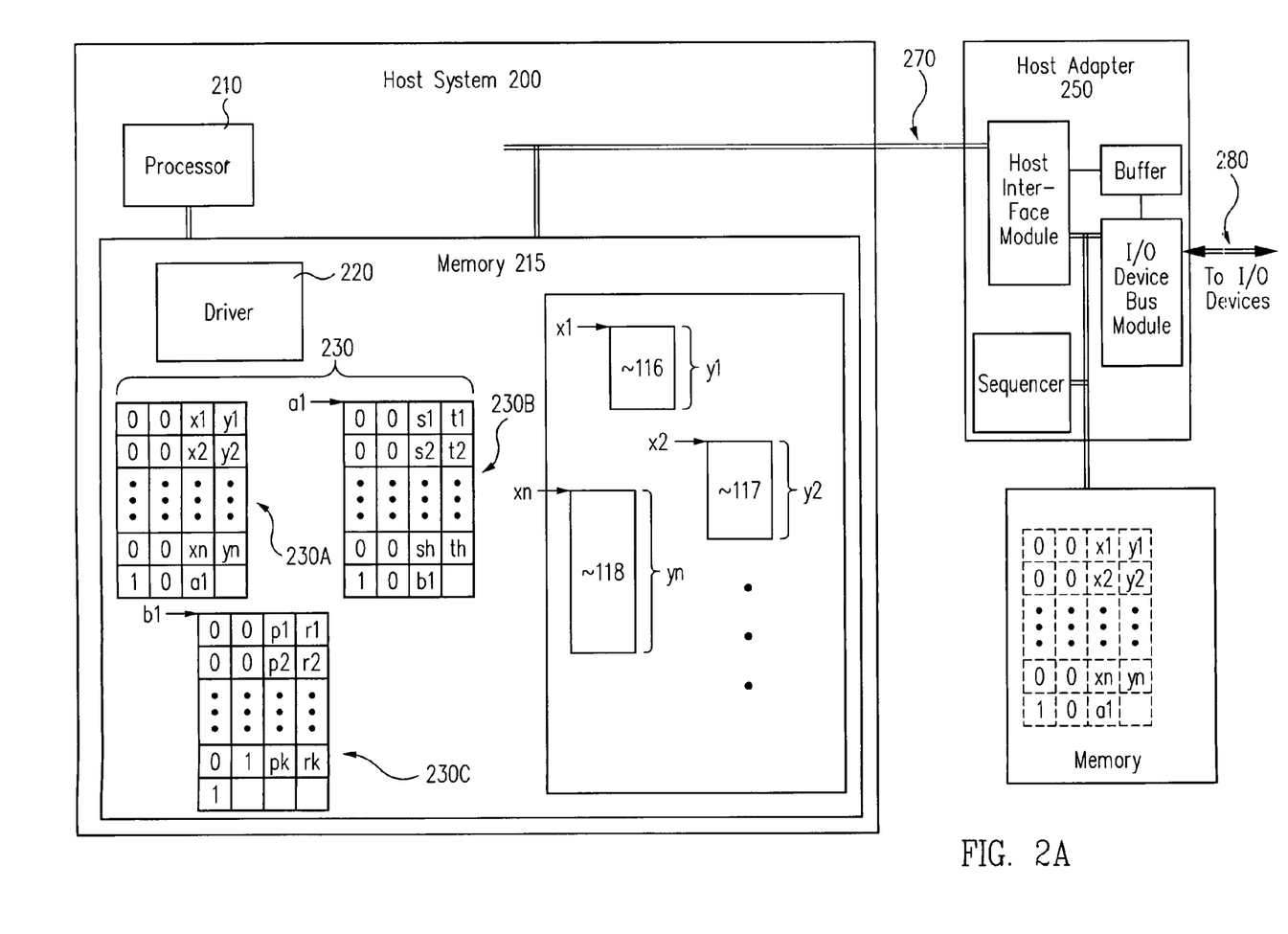
FIG. 2A is an illustration of a host adapter system with a memory that includes one embodiment of a sectioned scatter/gather list according to the present invention.

As explained more completely below, in one embodiment, each section of scatter/gather list 230 can have any desired size. This is particularly advantageous because scatter/gather list 230 is broken into sections corresponding to available sections of contiguous memory available in host memory 215. In another embodiment, each section of scatter/gather list 230 has a fixed size. In either embodiment, a link element in one section of scatter/gather list 230 is used to link to another section in list 230. The link element has a format that is the same as data elements that represent data segments in list 230. This means that no special hardware configurations or hardware management are required for processing the link element.

In one embodiment, as explained more completely below, each element in scatter/gather list 230 includes an end-of-list flag and an end-of-section flag. As used herein, a flag can have a plurality of states, e.g., set and cleared, and the name alone of the flag does not connote any particular state of the flag. When the end-of-list flag is set, e.g., has a second state different from a first state, host adapter 150 knows that the end-of-scatter/gather list 230 has been reached. When the end-of-section flag is set, host adapter 150 knows that an address to another section of scatter/gather list 230 is available.

When it is stated herein that a host adapter knows something, and/or that a host adapter takes a particular action, those of skill in the art will understand that either a processor used by the host adapter executes an instruction or sequence of instructions that results in the stated action or knowledge, or automated hardware of the host adapter performs the action or makes the determination.

In the embodiment of FIG. 2A, a driver 220 for host adapter 250 builds scatter/gather list 230 in memory 215. Scatter/gather list 230 includes a plurality of scatter/gather list sections, e.g., scatter/gather list sections 230A, 230B, and 230C, sometimes called sections 230A, 230B and 230C. In this embodiment, each of list sections 230A to 230C has a structure as illustrated by list section 230$m$ in FIG. 2B.

Figure 2B:
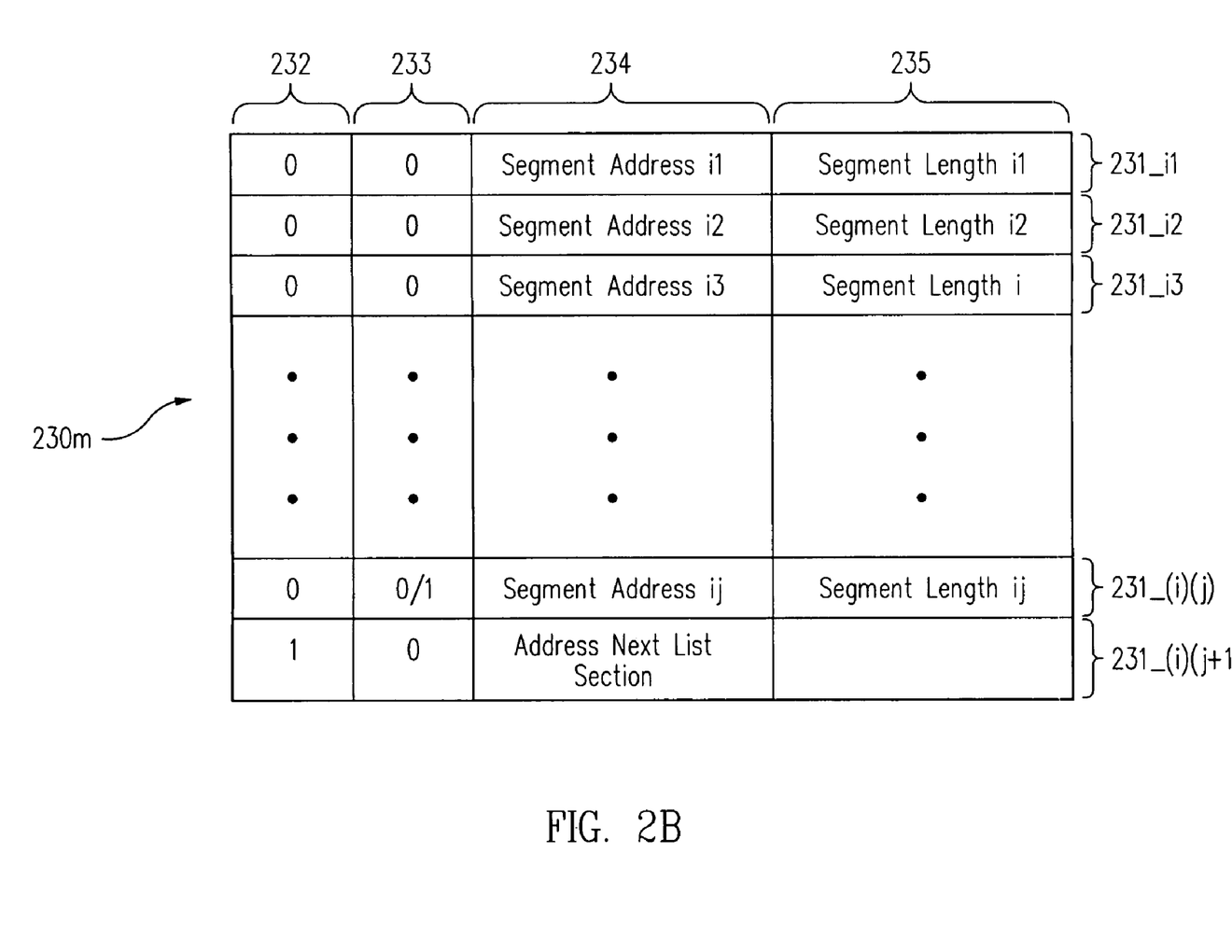
FIG. 2B is a template of one embodiment of sections of a sectioned scatter/gather list according to the present invention.

List section 230$m$ includes a plurality of elements 231_$i$1 to 231_$i$(j+1), where i denotes the section, and j the element in that section Thus, for the embodiment of FIG. 2A, i is A, B, or C, and j is n, h, or k. Each of elements 231_i1 to 231_i(j+1) includes an end-of-section flag 232, an end-of-list flag 233, an address field 234 and a length field 235, i.e., each element has the same format.

For elements 231_i1 to 231_ij, address field 234 contains an address of a memory segment in memory 215 and length field 235 contains the length of that memory segment. In this embodiment, end-of-list flag 233 is set to a first state, e.g., cleared for elements 231_i1 to 231_i(j−1), by driver 220. Driver 220 sets end-of-list flag 233 in element 231_ij to the first state, if element 231_ij is not the last data element in scatter/gather list 230. Conversely, end-of-list flag 233 in element 231_ij is set to a second state that is different from the first state by driver 220, if element 231_ij is the last data element in scatter/gather list 230.

In this embodiment, end-of-section flag 232 in link element 231_i(j+1) is set by driver 220 to a first state, e.g., cleared for elements 231_i1 to 231_ij. End-of-section flag 232 in link element 231_i(j+1) is set by driver 220 to a second state that is different from the first state to indicate that address field 234 of link element 231_i(j+1) contains an address to the next section in scatter/gather list 230. Note that in the last section, the state of end-of-section flag 232 is a don't care because the last link element is not processed in this embodiment.

Returning to FIG. 2A, scatter/gather list section 230A has n+1 elements, where n is an integer. Each of the first n elements, which are data elements, has a segment address xi, where i goes from 1 to n, and a corresponding segment length yi. End-of-section flag 232 and end-of-list flag 233 in each of the first n elements are set to zero.

The (n+1) element in scatter/gather list section 230A is a link element and, in this embodiment, end-of-section flag 232 is set to one by driver 220. The segment address field of the link element contains address a1, which is the starting address for segment 230B.

Scatter/gather list section 230B has h+1 elements, where h is an integer. Each of the first h elements, which are data elements, has a segment address si, where i goes from 1 to h, and a corresponding segment length ti. End-of-section flag 232 and end-of-list flag 233 in each of the first h elements are set to zero.

The (h+1) element in scatter/gather list section 230B is the link element and, in this embodiment, end-of-section flag 232 is set to one. The segment address field in this link element contains address b1, which is the starting address for segment 230C.

Scatter/gather list section 230C has k+1 elements, where k is an integer. Each of the first k elements, which are data elements, has a segment address pi, where i goes from 1 to k, and a corresponding segment length ri. End-of-section flag 232 and end-of-list flag 233 in each of the first (k−1) elements are set to zero. However, end-of-list flag 233 in element k is set to one by driver 220 because this is the last element in scatter/gather list 230 that must be processed.

Hence, in the embodiment of FIG. 2A, scatter/gather list 230 has three sections 230A to 230C that each have a different size, e.g., a different number of elements. Data can be transferred to or from memory 215 without host adapter 250 determining either the total number of elements making up scatter/gather list 230, or the number of elements in any particular section of list 230. When host adapter 250 detects an end-of-section flag 232 that is set, host adapter 250 uses the address in that element to access the next section of the list. When host adapter 250 detects an end-of-list flag 233 that is set, host adapter 250 knows that the last data element in scatter/gather list 230 has been reached.

Alternative embodiments of the present invention are useful in some situations. For example, in another embodiment, a scatter/gather list includes a plurality of sections of which section 230 m_1 (FIG. 2C) is an example. In this embodiment, fields 233, 234 and 235 are the same as described above and that description is incorporated herein by reference. However, end-of-section flag 232_1 is used differently in this embodiment.

Figure 2C:
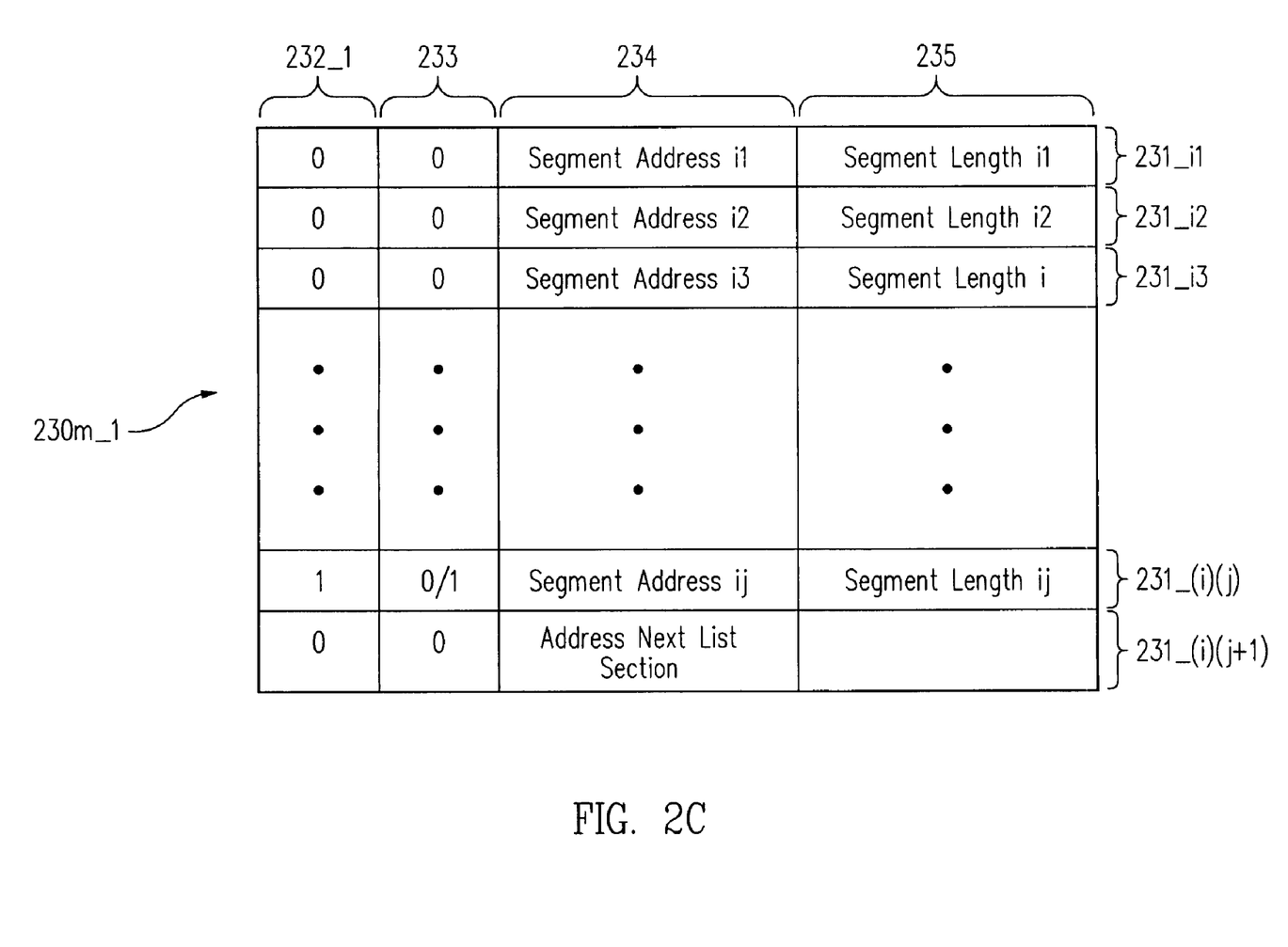
FIG. 2C is another template of a second embodiment of sections of a sectioned scatter/gather list according to the present invention.

In this embodiment, end-of-section flag 232_1 is set by driver 220 to a first state, e.g., cleared for elements 231_i1 to 231_i(j−1). The end-of-section flag in element 231_i(j), and not in link element 231_i(j+1), is set by driver 220 to a second state that is different from the first state to indicate that address field 234 of link element 231_i(j+1) contains an address to the next section in the scatter/gather list. Hence, in this embodiment, the end-of-section flag is set in the last element of the section defining a data segment, i.e., the last data element of the section, and not in the link element. This provides a scatter/gather manager an advance warning that the address in the next element is an address of the next scatter/gather list section.

Typically, address field 234 is eight bytes in size. Length field 235 is typically three or four bytes in size. For convenience, a scatter/gather list element has a size in bytes that is a power of two. Consequently, each scatter/gather list element typically is sixteen bytes in size and so has four or five reserved bytes, which can be used to implement flags 232 and 233. In one embodiment of the present invention, flags 232 and 233 are each one bit in size.

In the previous embodiment of the present invention, the data segments in memory 215 were assumed to have different sizes. However, further efficiencies are obtained in using a scatter/gather list if all data segments have the same size. In this embodiment, it is unnecessary to include the segment length in the scatter/gather list for each data segment and so up to eight bytes less are transferred for each scatter/gather list element. For this embodiment, all the necessary information is embedded in address field 234A (FIG. 2D) of the scatter/gather list.

Figure 2D:
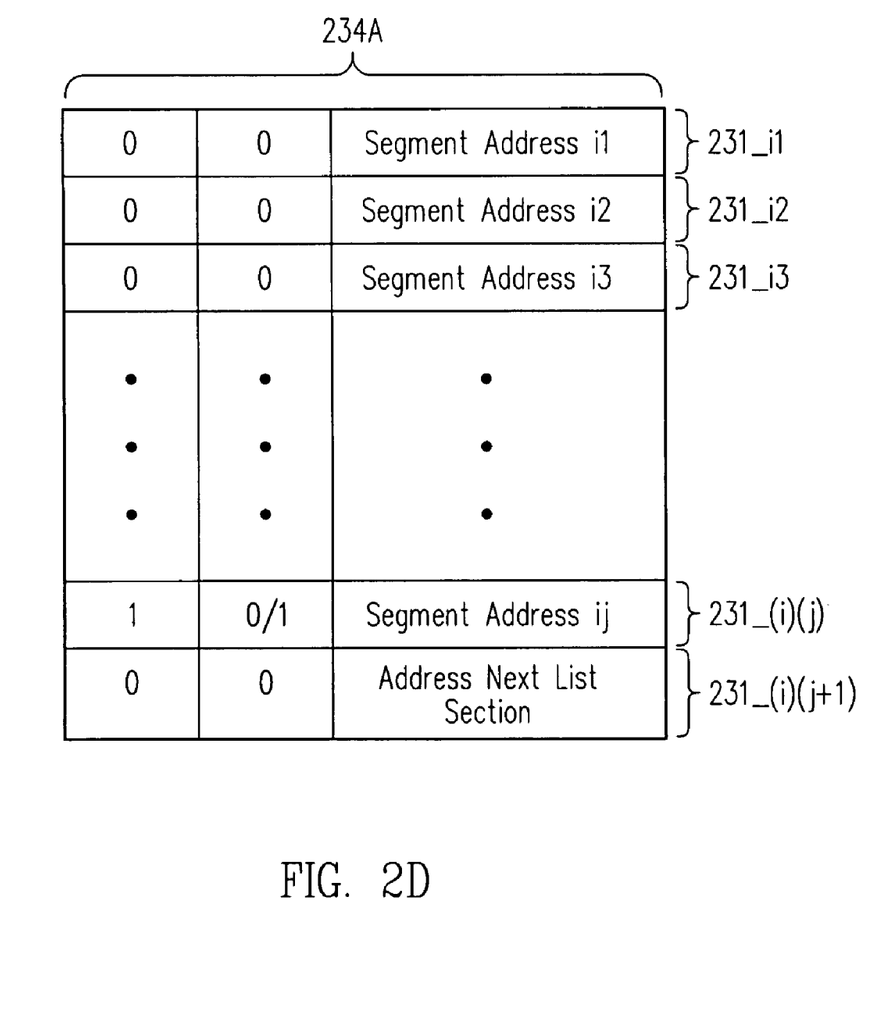
FIG. 2D is yet another template of a third embodiment of sections of a sectioned scatter/gather list according to the present invention.

Typically, address fields in a scatter/gather list element do not use all of the available eight bytes. The end-of-list and end-of-section flags are packed into address field 234A, and are implemented and used in the same way as described above. For example, as illustrated in FIG. 2D, the highest two bits, e.g., the two most significant bits, are used as end-of section and end-of-list flags within address field 234A. In another embodiment, the two least significant bits of address field 234A are used for the end-of-section and end-of-list flags.

Figure 3:
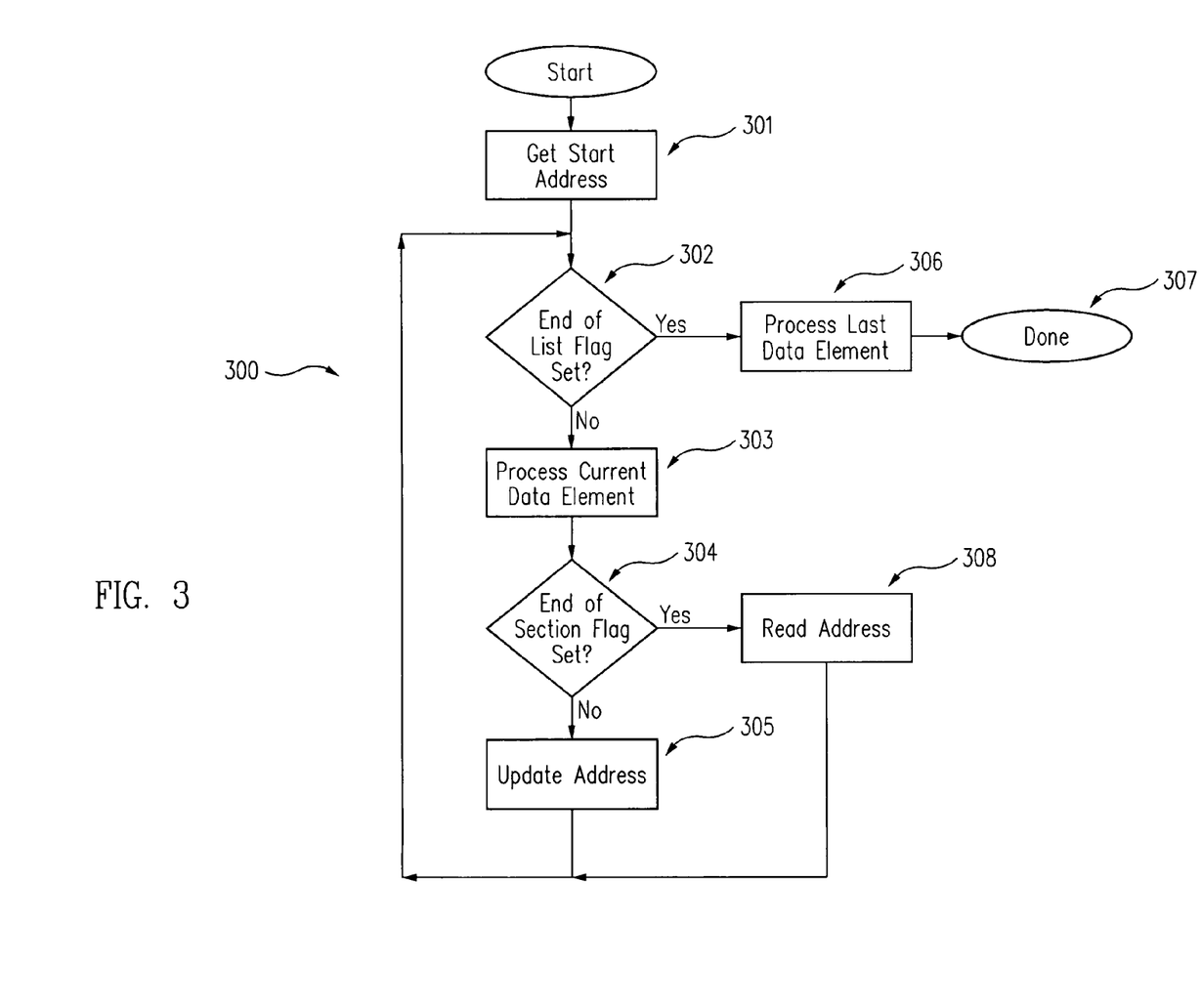
FIG. 3 is one embodiment of a process flow diagram for using the sectioned scatter/gather list of the present invention.

In one embodiment, a scatter/gather manager in host adapter 250 uses process 300 to process a scatter/gather list of this invention. Process 300 assumes that the end-of-section flag is set in the last data element of the section to indicate the end-of-the section.

In get start address operation 301, sequencer retrieves the address of the scatter/gather list from a sequencer I/O control block provided by driver 220 and provides the address to the scatter/gather manager.

The scatter/gather list element at the address is accessed, i.e., is the current list element. End-of-list flag set check operation 302 determines whether the end-of-list flag in the current list element is set. If the end-of-list flag is set, processing transfers to process last data element operation 306 and otherwise to process current data element operation 303.

In process last data element operation 306, the data segment specified by the current data element, which is the last data element, is used and then processing transfers to done operation 307 that in turn performs any necessary clean-up. In process current data element operation 303, the data segment specified by the current data element is used, and then processing transfers to end-of-section flag set check operation 304.

The end-of-section flag set check operation 304 determines whether the end-of-section flag in the current list element is set. If the end-of-section flag is set, processing transfers to read address operation 308 and otherwise to update address operation 305.

If the end-of-section flag is set, it means that the current data element is the last one in the section, and so read address operation 308 first increments the address to the next element in the list, which is the link element. Read address operation 308 loads the address in the address field of the link element so that the element at that address becomes the current element and transfers to check operation 302. Hence, processing of the next section of the scatter/gather list is started.

If check operation 304 transfers to update address operation 305, there are additional data elements in the current section of the scatter/gather list to process. Update address operation 305 changes the address so that the next data element in the section becomes the current data element and transfers processing to check operation 302.

Hence, with process 300, a multi-section scatter/gather list with sections located in discontiguous memory regions is processed as though the scatter/gather list was one contiguous list. This is done using only information in the list without any other variables. Moreover, the only limit on the size of the scatter/gather list is the size of the available memory. The only limit on the size of a particular section of the scatter/gather list is the number of contiguous memory locations available.

Host adapter 250 is not limited to any particular buses 270 and 280. Hence, the scatter/gather list of this invention can be used with any host adapter in a group of host adapters including a SCSI host adapter, a Fibre Channel host adapter, a UDMA host adapter, and a serial ATA host adapter. As is known to those of skill in the art, when a particular host adapter is selected the host adapter defines the bus protocols for I/O bus 280 and for I/O bus 270.

The embodiments of the present invention presented herein are illustrative only and are not intended to limit the invention to the specific embodiments described. In view of this disclosure, those of skill in the art can use the flags and sectioned scatter/gather lists in a wide variety of configurations.

I claim:

1. A memory having stored therein a structure readable by a host adapter comprising:
   a scatter/gather list comprising a plurality of scatter/gather list sections wherein each of said sections is stored in a different set of contiguous memory locations in said memory and said set of contiguous memory locations can be of any size, wherein at least one scatter/gather list section in said plurality of scatter/gather list sections comprises:
   a plurality of data elements, wherein each data element comprises:
      an end-of-list flag; and
      an end-of-section flag,
         wherein said plurality of data elements includes (j) data elements where j is an integer;
         said end of list flag has a first state in a first (j−1) of said data elements;
         said end of list flag in data element j has said first state if said data element j is not a last data element in said scatter/gather list, and has a second state different from said first state if said data element j is said last data element in said scatter/gather list; and
      each data element in said plurality of data elements includes:
      a segment address;
         wherein said segment address is associated with a location in a first memory having information stored therein and said information is to be transferred from said first memory to a second memory.

2. The scatter/gather list of claim 1 wherein said end-of-list flag has said first state in said each data element.

3. The scatter/gather list of claim 1 wherein said end-of-section flag has a same state in said each data element.

4. The scatter/gather list of claim 1 wherein said end-of-section flag has a first state in a last data element in said plurality of data elements, and a second state in all other data elements in said plurality of data elements.

5. The scatter/gather list of claim 4 wherein said end-of-list flag has said first state in said each data element.

6. The scatter/gather list of claim 4 wherein said end-of-list flag has said second state in said last data element in said plurality of data elements, and said first state in all other data elements in said plurality of data elements.

7. The scatter/gather list of claim 1 wherein said end-of-list flag has a size of one bit.

8. The scatter/gather list of claim 1 wherein said end-of-section flag has a size of one bit.

9. The scatter/gather list of claim 1 wherein said each data element further comprises:
   an address field including said segment address.

10. The scatter/gather list of claim 9 wherein said end-of-list flag, and said end-of-section flag are included within said address field.

11. The scatter/gather list of claim 1 wherein said each data element further comprises:
   a length field.

12. The scatter/gather list of claim 9 wherein said each data element further comprises:
   a length field.

13. The scatter/gather list of claim 1 said at least one scatter/gather list section further comprises:
   a link element comprising:
      an end-of-list flag; and
      an end-of-section flag.

14. A memory having stored therein a structure, readable by a host adapter, comprising:
   a scatter gather list comprising a plurality of scatter/gather list sections wherein each of said sections is stored in a different set of contiguous memory locations and said set of contiguous memory locations can be of any size, and further wherein at least one scatter/gather list section in said plurality of scatter/gather list sections comprises:
   a plurality of data elements, wherein each data element comprises:
      an end-of-list flag wherein said end-of-list flag has a first state;
      an end-of-section flag;
      an address field having a data segment address; and a length field having a data segment length wherein said data segment address and said data segment length are used in determining an area in a first memory having information stored therein and said information is to be transferred from said first memory to a second memory; and a link element comprising:
an end-of-list flag;
an end-of-section flag; and
an address field having a next list section address to another scatter/gather list section in said plurality of scatter/gather list sections.

15. A memory having stored therein a structure readable by a host adapter comprising:

a scatter/gather list comprising a plurality of scatter/gather list sections wherein each of said sections is stored in a different set of contiguous memory locations and said set of contiguous memory locations can be of any size, and further wherein at least one scatter/gather list section in said plurality of scatter/gather list sections comprises:

a plurality of data elements, wherein each data element consists of:
an address field comprising:
a data segment address;
an end-of-list flag; and
an end-of-section flag
wherein said plurality of data elements includes j data elements where j is an integer;
said end of list flag has a first state in a first (j−1) of said data elements;
said end of list flag in data element j has said first state if said data element j is not a last data element in said scatter/gather list, and has a second state different from said first state if said data element j is said last data element in said scatter/gather list; and
said data segment address is associated with a location in a first memory having information stored therein and said information is to be transferred from said first memory to a second memory; and a link element consisting of:
an address field comprising:
a next list section address;
an end-of-list flag; and
an end-of-section flag.

16. A computer system comprising:
a memory comprising a scatter/gather list, readable by a host adapter, comprising a plurality of scatter/gather list sections wherein each of said sections is stored in a different set of contiguous memory locations and said set of contiguous memory locations can be of any size, and further wherein at least one scatter/gather list section in said plurality of scatter/gather list sections comprises:

a plurality of data elements wherein each data element comprises:
an end-of-list flag; and
an end-of-section flag,
wherein said plurality of data elements includes (j) data elements where j is an integer;
said end of list flag has a first state in a first (j−1) of said data elements;
said end of list flag in data element j has said first state if said data element j is not a last data element in said scatter/gather list, and has a second state different from said first state if said data element j is said last data element in said scatter/gather list; and
each data element in said plurality of data elements includes:
a segment address;
wherein said segment address is associated with a location in a first memory having information stored therein and said information is to be transferred from said first memory to a second memory.

17. The computer system of claim 16 wherein said at least one scatter/gather list section further comprises:
a link element comprising:
an end-of-list flag; and
an end-of-section flag.

18. A computer system comprising:
a memory comprising a scatter/gather list, readable by a host adapter, comprising a plurality of scatter/gather list sections wherein each of said sections is stored in a different set of contiguous memory locations and said set of contiguous memory locations can be of any size, and further wherein at least one scatter/gather list section in said plurality of scatter/gather list sections comprises:

a plurality of data elements, wherein each data element comprises:
an end-of-list flag;
an end-of-section flag;
an address field having a data segment address; and
a length field having a data segment length wherein said data segment address and said data segment length are used in determining an area in a first memory having information stored therein and said information is to be transferred from said first memory to a second memory by said host adapter; and a link element comprising:
an end-of-list flag;
an end-of-section flag; and
an address field having a next list section address.

19. A method comprising:
storing a scatter/gather list, readable by a host adapter, as a plurality of sections in a memory, wherein each of said sections is stored in a different set of contiguous memory locations and said set of contiguous memory locations can be of any size, and further wherein each section includes a plurality of elements wherein each element comprises:
an address wherein said address is associated with a location in a first memory having information stored therein and said information is to be transferred from said first memory to a second memory;
an end-of-list flag; and
an end-of-section flag;
setting an end-of-list flag in a last element of a last section in said plurality of sections; and
setting an end-of-section flag in at least one of said plurality of sections other than said last section.

20. The method of claim 19 wherein said setting an end-of-section flag is performed on a last element in said at least one of said plurality of sections other than said last section.

21. The method of claim 19 wherein said setting an end-of-section flag is performed on a link element.

* * * * *